United States Patent [19]

Kennedy et al.

[11] Patent Number: 4,721,250
[45] Date of Patent: Jan. 26, 1988

[54] METHOD AND APPARATUS FOR EFFECTING CONTROL OF ATMOSPHERIC TEMPERATURE AND HUMIDITY

[75] Inventors: John Kennedy; Eric Watson, both of Palm Springs, Calif.

[73] Assignee: Canadian Microcool Corporation, Vancouver, Canada

[21] Appl. No.: 868,556

[22] Filed: Jun. 3, 1986

Related U.S. Application Data

[63] Continuation-in-part of Ser. No. 744,235, Jun. 13, 1985, abandoned.

[51] Int. Cl.$^4$ .............................................. B05B 1/34
[52] U.S. Cl. ...................... 239/383; 239/493; 239/565
[58] Field of Search .............. 239/383, 493, 2.1, 14.1, 239/565

[56] References Cited

U.S. PATENT DOCUMENTS

| | | | |
|---|---|---|---|
| 932,718 | 8/1909 | Rachmann | 239/383 |
| 3,788,542 | 1/1974 | Mee | 239/14.1 X |
| 3,901,447 | 8/1975 | Gross | 239/139 |
| 4,037,787 | 7/1977 | King | 239/2 R |
| 4,039,144 | 8/1977 | Mee | 239/2 R |
| 4,291,835 | 9/1981 | Kaufman | 239/383 X |

FOREIGN PATENT DOCUMENTS 320567 10/1929 United Kingdom ................ 239/493

Primary Examiner—Andres Kashnikow
Attorney, Agent, or Firm—I. Louis Wolk

[57] ABSTRACT

An environmental control system which atomizes filtered and purified or pretreated water introduced at high pressures through a plurality of spaced nozzles which have orifices having a diameter of about 10 microns to produce a mist of microscopic particles which evaporate at elevated temperatures by flash evaporation to produce a significant cooling effect. At normal temperatures cooling is minimal but humidification is obtained. The nozzles which may be especially designed to eliminate or minimize clogging of the orifices are installed in elongated pipes or conduits at selected intervals either in a single line or alternatively in a dual line of parallel pipes spaced one above or in front of the other with the nozzles arranged in a staggered manner so that the effluent spray is from the upper pipe and is not ejected above the spray from the lower pipe. Additionally, the pipes are positioned so that the ejection of spray from the nozzles can occur at angles which will provide an optimum spray pattern. The preferred nozzle design utilizes an internal impeller which imparts rotary turbulence to the stream of water as it enters the orifice, which is itself positioned in an insert which extends forward of its housing to minimize formation of mineral deposits.

5 Claims, 9 Drawing Figures

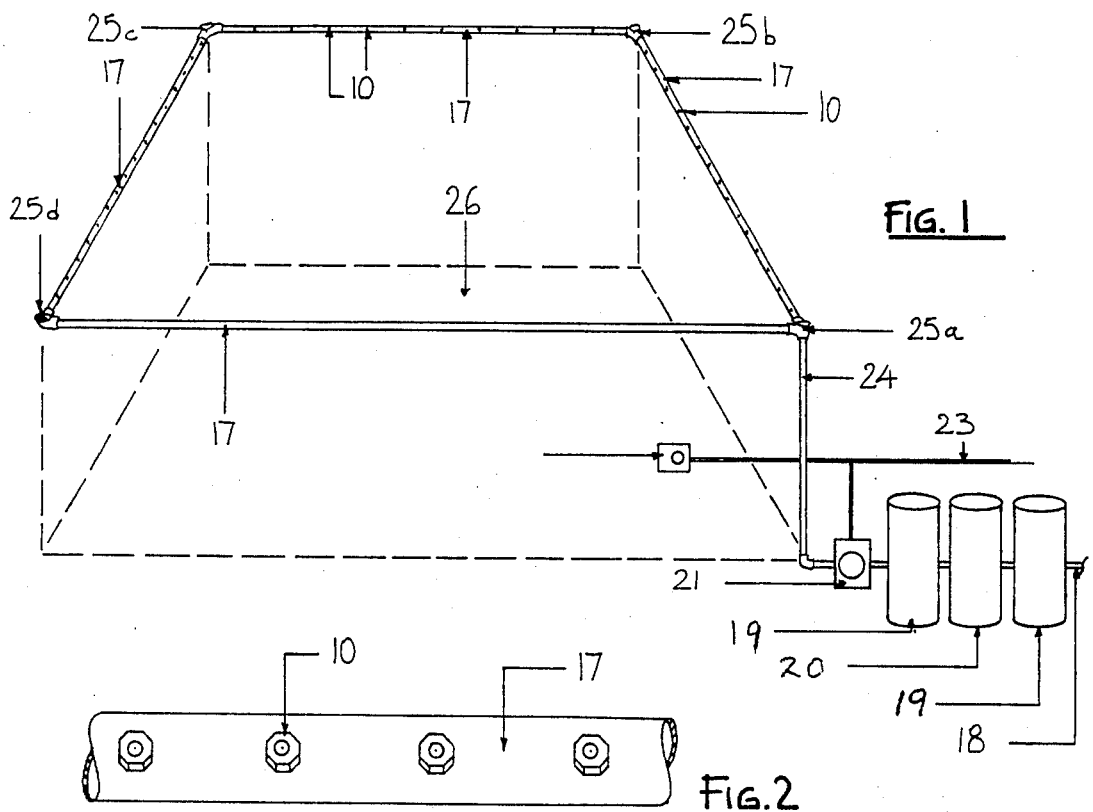
FIG. 1
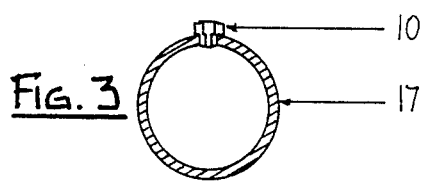
FIG. 2
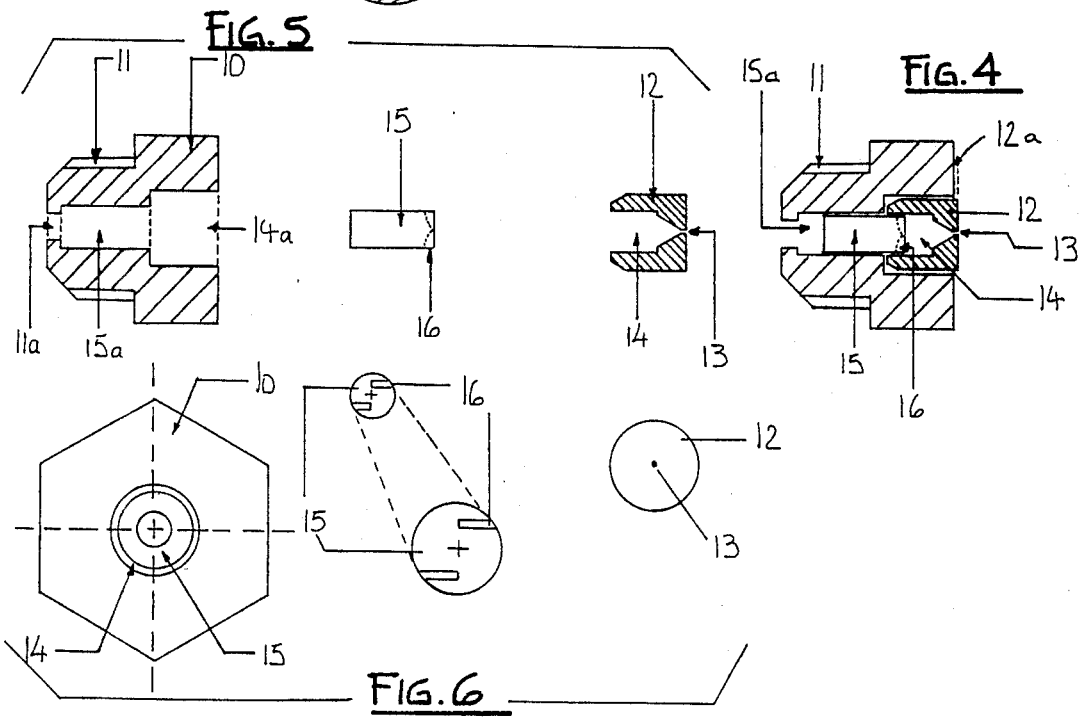

METHOD AND APPARATUS FOR EFFECTING CONTROL OF ATMOSPHERIC TEMPERATURE AND HUMIDITY

This application is a continuation-in-part of our Application Ser. No. 744,235, filed June 13, 1985 and which has becom abandoned.

BACKGROUND OF THE INVENTION

The use of small particles of water in the form of fog or mist or droplets to effect evaporative cooling or to reduce the risk of frost damage to crops by creating a blanket of dispersed water particles, and to effect control of temperature and humidity for various agricultural and environmental purposes is well known. For example, U.S. Pat. No. 4,039,144 to Mee describes a system in which such results are claimed using a droplet producing nozzle having an orifice in the range of 125-400 microns which projects a stream of water against a smooth solid surface to further disperse the water stream into small sized particles. Similarly, the U.S. patent to Mee, U.S. Pat. No. 3,344,691, projects a stream of water against a pin having a curved convex surface for the same purpose.

In general, the use of nozzles which utilize streams of water under pressure to generate fogs or mists by impact against pins or other surfaces is well known as shown by the above mentioned patents as well as by others such as U.S. Pat. No. 2,701,265 to Bete el al.

Such systems produce water particles having a wide range of diameters and have not achieved the degree of effectiveness which might be possible with particles of uniform small dimensions. In the case of the Mee patents referred to above approximately half of the droplets produced have a diameter larger than 15 microns as a result of which is substantial proportion of the water is not effectively evaporated, or maintained in the form of a desired fog or mist for a sufficient period of time resulting in premature or excessive precipitation. None of these describe the generation of mists or fogs using nozzles with an orifice having a diameter of 10 microns.

The generation of a mist of water particles of the order of 10 microns through a nozzle with an orifice of that diameter, when incorporated in a system which preliminarily filters and purifies the water supply under a water pressure of 500-700 psi can effectively cool a predetermined area through flash evaporation. However, the use of a conventional type of nozzle with an orifice of such small diameter may result in problems created by deposition on or in the orifice of residual mineral materials contained in the water after prolonged use, even with careful preliminary purification and filtering.

SUMMARY OF THE INVENTION

Applicants have discovered that environmental control of outdoor and indoor areas can be achieved by atomizing purified water in the form of microscopic particles or fine mist by means of atomizing nozzles of the type described through orifices having a diameter of about 10 microns in an elevated position under controlled conditions of particle size, pressure, temperature and humidity. This procedure requires preliminary purification of water to remove particles exceeding a size of 10 microns by filtration as well as excessive levels of minerals by preliminary purification treatment, after which the purified water is pumped under pressure to spaced atomizing nozzles which are designed to provide an aerosol mist in which substantially all of the water particles have a diameter of the order of 10 microns over the selected area. These particles are then flash evaporated when cooling is desired into the hot ambient air resulting in the formation of cooler air of increased humidity but which being of greater density floats downward. When these nozzles are positioned, for example, over a tennis court, or an outdoor patio, or a roof, it is apparent that a significant degree of cooling can be attained. The nozzles generate billions of 10 micron sized particles of atomized water which flash evaporate when mixed with hot air or on coming in contact with any warm surface. The hotter and drier the air, the greater the percentage reduction in temperature. In agricultural application where frost prevention or moisturization is required, flash evaporation does not occur because elevated temperatures are not involved, however, in such situations, the generation of fogs or mists is effectively achieved.

In practice, the system consists of an arrangement of atomizing nozzles mounted at spaced intervals along a conduit or series of conduits outlining the area or space to be cooled or otherwise treated and supplied with purified water under sufficient pressure to produce the desired aerosol mist particles. Generally, pressures of 500-700 pounds per square inch are required to atomize particles having a diameter of about 10 microns. The system is operated under controls which activate the water flow and the atomizing nozzles in accordance with temperature and humidity conditions so that the evaporation can be initiated at ambient temperatures and discontinued in accordance with a predetermined temperature drop. By the same token, if the humidity rises to an undesired level, the atomization can be discontinued.

In actual practice the system consists of three major components. The first is a high pressure (500-700 psi) pumping system. The second is a network of piping, such as reinforced PVC pipe of desired diameter, say ½-¾ in., with spray atomizing nozzles spaced at intervals, generally of 6 inches to 2 feet. The third component is a water treatment system to avoid clogging of nozzles due to mineral build-up. The central pumping system controlled by a combination of thermostats, humidistats, and automatic timers, controls the flow of water through the piping system. Cooling or other desired results are effected by positioning the piping system, for example, in an outdoor area adjacent to an interior area to be cooled and by means of flash evaporation cooling such outdoor area and thereby permitting the indoor area to remain cool or utilize less air conditioning to effect cooling, or in the case of outdoor areas such as patios or tennis courts to effect cooling by flash evaporation of an area surrounded or enclosed by the piping system in an elevated position to generate a blanket of cooled air. The level of effectiveness in cooling is such that in an application to an outdoor area, the temperature can be reduced to as low as 75°-80° regardless of the ambient exterior temperature depending also on the relative humidity. For example, if the outside temperature is 120°, with humidity of 15%, or 90° with 40 humidity, the treated air can be reduced to approximately 75°-80° F.

As described above, one important application of the method and apparatus described herein relates to evaporative cooling by flash evaporation of the minute water particles generated by the novel nozzles of the invention. In addition, various other applications in the field of environmental control include freeze protection of plants in which fog generated by this system will blanket the plants and by saturating the surrounding air will trap and reflect radiant heat. Humidity control may be effective in improving the growth rate of plants both indoors and outdoors and both pesticides and fertilizers may be applied to plants by introducing measured proportions of these chemicals into the system to be dispersed in the water droplets which will permit uniform application to and absorption by the leaves. Other applications include aeroponics or growth of plants with roots suspended in humidified air and various uses for control of heat and moisture in greenhouses.

It has been found that the control of climate in greenhouses by this means, that is, the control of temperature and humidity which is achieved by flash evaporation of microscopic water particles, is effective in obtaining higher plant yields and improved quality. This system is also ideal for use in shade houses and outdoor nursery locations.

Applicant has further discovered that mists or fogs of water dispersed in a spray of water particles having a diameter of about 10 microns for use in environmental cooling by flash evaporation or for protecting crops against frost damage and for various other invironmental and agricultural purposes may be effectively produced using the system described while minimizing excessive precipitation and deposition of scale to plug the nozzles which generate such droplets by incorporating a novel type of nozzle construction in a high pressure water supply system accompanied by preliminary filtration and water purification. Such a nozzle is designed with an internal impeller to effect turbulence prior to entry into the nozzle orifice and the nozzle orifice itself is positioned within an insert which projects slightly beyond its enclosure in order to prevent build up of mineral deposits over a period of time. The impeller is designed with grooves positioned at one end which cause rotation thereof under the impact of a water stream. The impeller with these grooves or notches is positioned within the nozzle so that they are adjacent to the nozzle orifice and appear to facilitate distribution of the water particles to produce an improved spray pattern.

As described herein in the design of the nozzle orifice insert itself, it has been found that by projecting said insert with the orifice forward a short distance from its supporting structure the formation of residual deposits during non-flow periods because of evaporation of residual beads or droplets which remain on the nozzle is minimized or eliminated.

The effectiveness of the nozzle and improvement of the type of spray operated is further enhanced by the incorporation of a rotatable impeller or poppet within the nozzle and adjacent to the inlet to the orifice as described below.

Additionally, applicants have discovered by incorporating a chemical additive in the water prior to atomization either continuously or intermittently, scaling or precipitation of minerals or colloidal materials not removed by preliminary treatment may be further minimized or eliminated.

Applicants have further discovered that a flexible and effective utilization of the spray system can be achieved by installing the pipes carrying the nozzles in spaced horizontal parallel pairs with the pipes and nozzles being so arranged that the nozzles present a staggered pattern in order that the nozzles in one pipe are not superimposed upon those in the adjacent pipe and further that the nozzles in one pipe may be activated separately from those in the adjacent pipe whereby those in the lower pipes may, for example, be initially activated at a given temperature, and those in the upper pipe may be activated at a higher ambient temperature, thus permitting the formation of a greater amount of spray at a closer spacing as the temperature and cooling requirements increase. In addition, the installation may be such that the angular direction of the nozzles in the respective pipes and the resultant spray is such that a wider and more effective spray pattern is achieved as described further below with respect to the drawings.

In the operation of the system utilizing the double line of spray nozzles for use in atmospheric cooling, one line of mist may be turned on at a temperature say of 90° F. shade air temperture. If the temperature then rises to a point substantially above 90° F., say 100° F., the second line of mist would then be turned on. The water feed to the lines may be controlled manually or by means of thermostatically controlled valves. The nozzles lateral spacing may be selected in accordance with conditions under which the system is to operate. If, for example, the nozzles are spaced 24 in. apart in each line in the staggered arrangement of the double line, the resulting spray or mist will emanate every 12 in. Under low humidity desert air conditions, for example, it is possible to reduce the temperature in the area being cooled from 100° F., or more to about 85° F., shade air temperature. Since the evaporative effect is adversely affected by high humidity as the moisture content of the air in the treated area increases, the second line may be turned off manually or automatically and the point where condensation begins to occur, the humidostat which controls the system would automatically turn the water flow off. Similarly, since high winds also disrupt the spray and dissipate the cooled air, the system can be shut off when this occurs. In addition, it has been found that the nozzles should preferably be mounted in the conduits so as to project the spray at one preferred angle to the horizontal from the lower or front conduit and at a greater angle to the horizontal from the upper or rear conduit. As described herein such preferred angles are at about 10° in the lower or front nozzles and 25° in the upper or rear conduits.

BRIEF DISCRIPTION OF THE DRAWINGS

FIG. 1 is a plan view showing an enclosure with piping installed at an elevated level with nozzles arranged around its periphery and connected to a water supply system as described below.

FIG. 2 is a detail showing a segment of piping with nozzles of FIG. 1.

FIG. 3 is a transverse cross section through a pipe and nozzle.

FIG. 4 is a longitudinal cross sectional view of an assembled nozzle of the invention.

FIG. 5 is a view in longitudinal cross section of the elements of the nozzle shown in FIG. 4 disassembled.

FIG. 6 is front view in elevation of the elements of FIG. 5.

DETAILED DESCRIPTION

Figure 7:
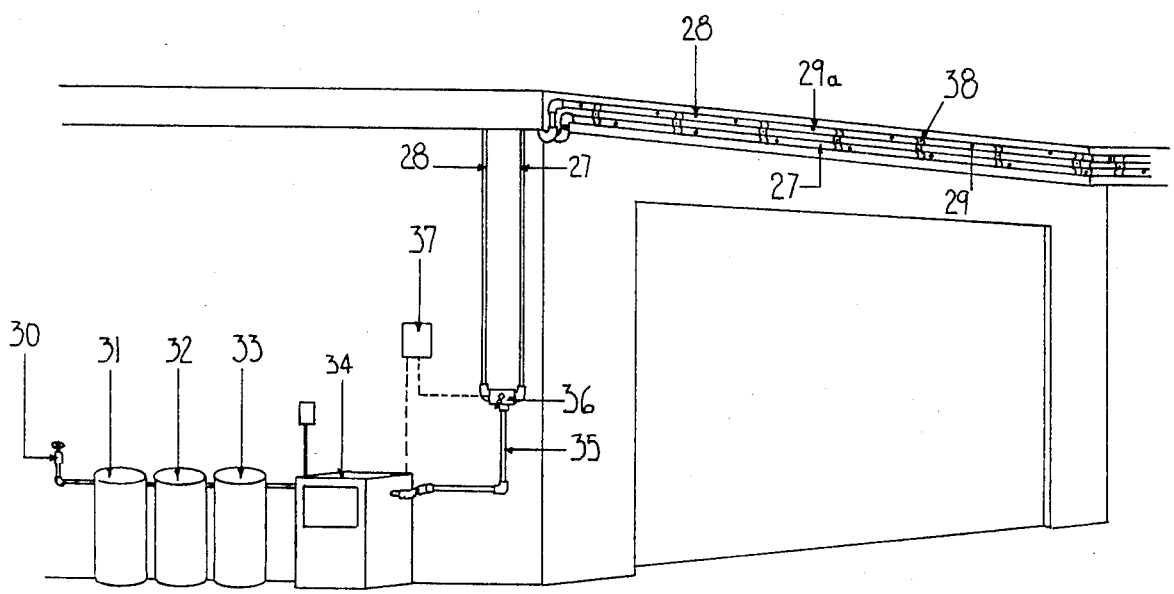
FIG. 7 is a plan view of a modified system utilizing a dual configuration of conduits and nozzles.

As shown in FIG. 1, the nozzles 10 which are described in detail below are installed in conduits 17 of suitable composition and dimensions. These may be formed of metal or plastic and in general it has been found that extruded polyvinyl chloride conduits, especially those formed of ultraviolet light and temperature and pressure resistant compositions are especially suitable for long term use outdoors. Such tubing may have any suitable I.D., but ¼" is quite satisfactory. The conduits are connected to a water supply line 18 and the water is then passed through a filter shown at 19 to remove particles larger than 10 microns. In some cases, it may be desirable to pretreat the water chemically by passage through a conventional demineralization purification system which is optionally shown at 20. The treated water is then pumped into the piping system by means of a high pressure pump 21 at a pressure in the range of about 500–700 psi and preferably 600 psi. A thermostat-humidistat 22 placed in an appropriate position to measure temperature and humidity and adjusted to the desired operating level will controll water flow through the pump by controlling the flow of current through wires 23. As shown, the treated water flow to any desired section may be selectively controlled by valves 25a, 25b, 25c and 25d.

Although for purposes of illustration a rectangular enclosure is described, the piping system with attached nozzles may be arranged in accordance with the particular application required, for instance, if roof cooling is desired, the conduits with spaced nozzles are arranged along and above the roof line. If cooling of a patio or tennis court is desired, the piping system is arranged at a suitable elevation to surround the desired area to be cooled. In the case of agricultural application, for example, for the generation of frost preventive fogs or mists, the piping system may be positioned above and between rows of plants or trees.

The nozzles are spaced apart in the conduits to the extend necessary to produce the desired pattern of spray and such spacing will vary with the type of use and temperature and humidity conditions which are expected to be encountered. For most applicants, spacing 6–24 inches appears to be satisfactory as determined by the nature of the application.

The generation of a mist or spray in which the water particles substantially all have a diameter or particle size of about 10 microns has been found to be essential in order to produce the required degree of flash evaporation and cooling, to avoid excessive precipitation, or to generate a desired type of fog or mist for other applications as referred to herein.

FIG. 2 is a view showing a segment of the piping system of FIG. 1 with spaced nozzle 10 mounted in conduit 17.

FIG. 3 is a traverse section through nozzle 10 and pipe 17 of FIG. 2.

FIG. 4 is a longitudinal view in cross section of the assembled nozzle of the invention while FIGS. 5 and 6 describe the components of the nozzle disassembled. As shown, nozzle 10 is composed of a threaded housing 11, to be inserted into corresponding threaded openings in the conduit, formed of brass or other metal having a water inlet 11a, and into the front end of which is positioned a cylindrical steel orifice insert 12 in the center of which an orifice 13 having a diameter of 10 microns has been bored. This insert is provided with an interior cylindrical chamber 14. The insert is dimensioned to be force fit into a corresponding chamber 14a formed in the forward section of housing 11. As described in greater detail below, the insert and housing 14a are dimensioned to permit the insert to project forward of the housing to a small extent so that in effect the orifice itself is in a forward projecting position. With regard to the forward projection of the orifice referred to, it has been found that by positioning the orifice in a manner which will cause it to project forward to the housing to a slight extent the clogging opening due to deposit of the minute amounts of minerals that may remain in the water after filtration and purification will be minimized or prevented. Unless this arrangement is provided, use of the system for prolonged periods of time during which the spray has gone on and off many times, droplets of water tend to remain in contact with the orifice of the prior system during periods when the water supply is turned off and evaporation of these droplets will eventually result in full or partial clogging of the orifice. It has now been discovered that by projecting the orifice to a slight extent forward of the housing, the formation of residual droplets and consequent deposition of minerals is greatly minimized. This permits longer operation of the system without necessary frequent replacement or cleaning of the orifices.

It has been found that moving the orifice insert forward of the spray housing by even a small distance will accomplish this result. In practice, it is found that by moving the orifice forward of the housing by a distance of at least 0.005 inches is effective. A preferred and practical distance is about 0.020 inches although a greater forward distance of projection may be used if desired. The diameter of the insert itself must be kept to a minimum in order that the area surrounding the orifice can be kept to a minimum. From a practical standpoint, the dimensions of the insert are determined by the ability to machine and bore the high quality stainless steel or other hard and corrosion resistant material in which the orifice is formed. In practice, the insert can be formed to have a diameter of as low as 0.15–0.25 inches with a larger diameter up to about 0.5 in. is satisfactory. Diameter larger than this would tend to eventually form undesired deposits after extended use. The limiting factor in determining the minimum diameter of the insert is the necessity for providing the internal chamber, chamber 14, for the reception of a cylindrical steel poppet or impeller 15 which is inserted into chamber 15a of housing 11 prior to insertion of the orifice insert 12. The poppet 15 is provided with a pair of curved or contoured slots spaced apart 16 as shown in FIGS. 5 and 6 and is slidably positioned with said slots being slightly curved as shown by the dotted lines facing orifice 13 within the chamber formed by bore 14 in insert 12 and bore 15a in housing 11. Poppet 15 has a diameter slightly smaller than the diameter of 14 and 15a and is assembled in the manner illustrated in FIGS. 5 and 6. In FIG. 6, the poppet 15 is shown also in enlarged form to better illustrate the position of slots 16 and the space between the poppet and the walls of chambers 14 and 15a, and which has become abandoned. In practice, it has been found that the inner diameter of chambers 14 and 15a should be about 0.100 in. and the diameter of the poppet should correspondingly be only slightly less say about 0.09" in order to achieve the proper turbulence and circulation. This provides a space of about 0.01" surrounding the impeller which is found to be preferred in order to achieve proper turbulence.

In operation, as the water under pressure flows into nozzle 11, it impacts the impeller or poppet 15 driving it toward the entrance to the orifice 13, flowing around the poppet through spaces between it and the walls of the chambers surrounding it and at the same time causing it to rotate by the action of the water flow against slots 16 formed in the end. This creates turbulence as the water enters and flows through the orifice. This turbulence is a factor in generating a fine mist having a wide pattern of distribution and at the same time helps to prevent or remove any scale which might have a tendency to form in the orifices. The turbulence created by the impeller 15 also appears to have a role in maintaining the desired 10 micron size of the water particles by retarding agglomeration of the particles upon leaving the orifice.

As shown in FIG. 7, a modified system and procedure is described in which a pair of conduits or pipes is positioned with one conduit 27 positioned beneath the other conduit 28. The two parallel conduit are each provided with nozzles designed to emit a spray from 10 micron orifices as described above, however, the spacing of the nozzles is such that the upper and lower nozzles 29 and 29a are staggered. This permits the nozzles in each line to be spaced farther apart than in the single line system described above but allows a closer spacing to become effective in accordance with greater air conditioning requirements. When the system is in operation, water under normal pressures is supplied through a supply 30 and first passes through a 10 micron filter 31 to remove particles larger than 10 microns, then into a water treatment chamber 32 containing chemical demineralizing and/or water softening chemicals, thence through an additional filter 33, which removes particles of 5 microns or larger to ensure further elimination of particles which may clog the nozzles. The treated water then enters a high pressure pump 34 where the water is pumped at a pressure of 500–700 psi into the conduits 27 and 28. Under most conditions the water flows through conduit 27 and nozzles 9 at all times during operation while a valve 36 in conduit 28 remains closed as temperature or other conditions require it, valve 36 is opened and nozzles 29 become operative as well thus effecting a more numerous spacing of the emitted sprays. The system and water flow may be controlled manually, but preferably by means of a thermostat-humidostat 37 which is suitably located and is responsive to ambient conditions and adjusted to respond to those conditions which are selected by the user. Similarly, the operation of the second or upper line of nozzles may be controlled by manual operation of valve 36, but in some cases, it, too, may be replaced by an electrically operated valve of the solenoid type responsive to changes in temperature and/or humidity.

As shown in FIG. 7, the dual conduits are positioned one above the other vertically as in case of mounting on a vertical wall or side of a house. Where the dual arrangement is to be positioned on a horizontal or sloping area as on a roof, the lower conduit is positioned in front and the upper conduit at the rear.

Figure 8:
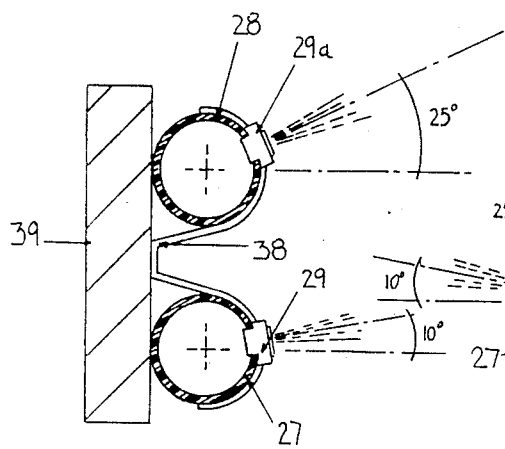
FIG. 8 is detail showing the dual conduit arrangement of FIG. 7 in cross section as mounted vertically.

As discussed above, in order to ensure a suitable spray pattern in which agglomeration of adjacent sprays is minimized, it has been found preferable to position the nozzles so that the spray is emitted at a desired angle. As shown in FIG. 8, the conduits 27 and 28 are mounted one above the other with the nozzles 29 on conduit 27 positioned to emit spray at one angle of about 10° to the horizontal and nozzles 29a on conduit 28 positioned to emit spray at an angle of about 25°. This ensures that the superimposed position of the nozzles and the resultant spray does not create a spray pattern in which adjacent sprays tend to interengage and cause coalescence of water particles.

Figure 9:
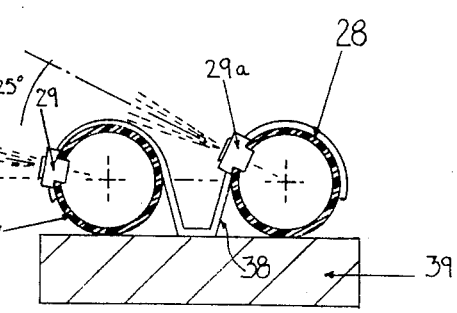
FIG. 9 is a detail showing the mounting of the dual conduits in cross section as mounted horizontally.

The parallel conduits should be spaced close together preferably adjacent or no more than a few inches apart and held together for spacing and mounting purposes by bracket 38, as shown mounted upon a portion of a wall 39.

Where the dual conduits are to be mounted upon a horizontal or sloping surface, the conduit 27 would be positioned in front and conduit 28 behind it as shown in FIG. 9 with the nozzles 29 at an angle of about 10° to the horizontal and nozzles 29a at an angle of about 25° to the horizontal as shown, the conduits are spaced and supported by brackets 38 attached to the horizontal (or sloping) surface 39.

In addition to the mechanical effects of the nozzle as aforesaid, it has further been found that injection of a particular chemical additive to the water supply can serve as a supplementary means for preventing or minimizing the formation of scale in the system or deposition in the nozzle orifice. At the same time this chemical appears to be effective in preserving the integrity of the water droplets or mist particles and increases the stability of the spray. These results are achieved by introducing small quantities of a solution of polyacrylic acid in water in proportions determined by experience with water of different mineral content but generally in the proportion of less than 5 mg/liter or from 11–5 mg. per liter. This chemical may be introduced into the system from a separate tank by means of a chemical metering pump connected to the supply line 18 before or after circulation through filter 19 or optional purification unit 20. Or the chemical may be introduced into the system at any desired point by means of a well known type of venturi mechanism which draws a metered quantity of the chemical into the system.

A preferred formulation for the polyacrylic acid is in the form of a 35% solution by weight in water with the incorporation of 1% or less of citric acid as a buffering agent. The polyacrylic acid appears to function by coating particles which are below 10 microns in diameter which would pass through the filter to facilitate their dispersion in the spray and to sequester dissolved trace quantities of mineral salts which may be retained in the water, including calcium sulfate, calcium and magnesium carbonate, barium and strontium carbonate, together with iron oxides, silicates and silica. Other known water softening agents or zeolites may also be utilized.

Having thus described our invention, we claim:

1. An environmental control system for atmospheric control of temperatur and/or humidity in a given area which comprises, a water supply means, means for filtering said water to remove particles having a diameter greater than 10 microns therefrom, means for pumping said filtered water to an elongated conduit positioned within said given area at a pressure of 500–700 psi, said conduit having incorporated thereon a plurality of spaced apart nozzles each of which is provided with a spray orifice having a diameter of about 10 microns to thereby generate a spray pattern of microscopic water particles for rapid evaporation with resultant cooling and/or humidification, each of said nozzles comprising (a) a housing inserted into said conduit, (b) an insert positioned within the forward portion of said housing formed with an orifice passage having a diameter of about 10 microns for projecting said spray pattern of microscopic particles from said nozzle, said insert having a cylindrical chamber therein positioned inward of said orifice, (c) a cylindrical chamber within said housing extending rearward of said insert said chamber being coextensive with and having the same diameter as the chamber within said insert, (d) a closely fitting rotatable cylindrical impeller positioned within said chambers in said housing and said insert, having a diameter only slightly less than the diameter of said chambers, to provide a proper degree of turbulence, said impeller being adapted to slide back and forth longitudinally of said chamber, (e) said insert being positioned to project forward of said housing by a distance of about 0.005–0.020 inches in order to prevent retention of water droplets at the orifice exit after cessation of water flow to minimize deposition of minerals and avoid clogging of the orifices.

2. A system according to claim 1 wherein a pair of elongated conduits are positioned side by side in parallel with one in front of or below the other, each of said conduits being provided with uniformly spaced apart nozzles therein positioned to emit spray over a designated area, said nozzles in each conduit being spaced laterally between the nozzles in the adjacent conduit to provide a uniform laterally staggered spray pattern.

3. A system in accordance with claim 2 in which the nozzles in the front or lower conduit are positioned to emit a spray at an angle of about 10° to the horizontal and the nozzles in the rear or upper conduit are positioned to emit a spray at an angle of about 25° to the horizontal.

4. A system according to claim 2 wherein the water supply to the front or lower conduit is initially activated at a given temperature and the water supply to the other conduit is separately activated at a higher temperature.

5. A nozzle for producing a spray of finely divided water particles from an orifice in which substantially all of the particles emitted from said orifice have a diameter of the order of 10 microns which comprises a housing, a water inlet, an external bore forming a cylindrical chamber within said housing communicating with said water inlet at one end, an insert positioned within said housing at the other end having an orifice with a diameter of about 10 microns formed therein, a cylindrical chamber within said insert communicating with said first named cylindrical chamber in said housing and having the same diameter, a closely fitted rotatable cylindrical impeller positioned within the aforesaid communicating chambers having a diameter slightly less than the diameter of said chambers to provide a space therebetween of about 0.01 inch, said impeller being in the path of flow of the water between the water inlet and the orifice and formed with a pair of spaced slots at the end thereof adjacent to the orifice, and said insert projecting forward from said housing to a slight degree between about 0.005–0.020 inches to avoid formation and retention of residual droplets upon cessation of water flow.

* * * * *